(12) United States Patent
Sultenfuss et al.

(10) Patent No.: US 10,067,546 B2
(45) Date of Patent: Sep. 4, 2018

(54) SYSTEM AND METHOD FOR PROVIDING WIRELESS POWER FEEDBACK IN A WIRELESS POWER DELIVERY SYSTEM

(71) Applicant: Dell Products, LP, Round Rock, TX (US)

(72) Inventors: Andrew T. Sultenfuss, Leander, TX (US); Mitchell Markow, Hutto, TX (US)

(73) Assignee: Dell Products, LP, Round Rock, TX (US)

(*) Notice: Subject to any disclaimer, the term of this patent is extended or adjusted under 35 U.S.C. 154(b) by 34 days.

(21) Appl. No.: 14/942,662

(22) Filed: Nov. 16, 2015

(65) Prior Publication Data

US 2016/0070322 A1 Mar. 10, 2016

Related U.S. Application Data

(63) Continuation of application No. 13/475,652, filed on May 18, 2012, now Pat. No. 9,218,031.

(51) Int. Cl.

| | |
|---|---|
| *G06F 1/26* | (2006.01) |
| *H02J 50/40* | (2016.01) |
| *H02J 50/00* | (2016.01) |
| *H02J 50/80* | (2016.01) |
| *H02J 7/02* | (2016.01) |
| *H04B 5/00* | (2006.01) |
| *H02J 7/04* | (2006.01) |
| *H02J 50/12* | (2016.01) |
| *H02J 50/20* | (2016.01) |
| *H02J 50/30* | (2016.01) |
| *H02J 50/05* | (2016.01) |
| *H02J 5/00* | (2016.01) |
| *H02J 7/00* | (2006.01) |

(52) U.S. Cl.
CPC .............. *G06F 1/26* (2013.01); *H02J 7/025* (2013.01); *H02J 7/045* (2013.01); *H02J 50/00* (2016.02); *H02J 50/40* (2016.02); *H02J 50/80* (2016.02); *H04B 5/0037* (2013.01); *H02J 5/005* (2013.01); *H02J 50/05* (2016.02); *H02J 50/12* (2016.02); *H02J 50/20* (2016.02); *H02J 50/30* (2016.02); *H02J 2007/0096* (2013.01)

(58) Field of Classification Search
None
See application file for complete search history.

(56) References Cited

U.S. PATENT DOCUMENTS

| | | | |
|---|---|---|---|
| 8,412,963 B2 | 4/2013 | Tsai et al. | |
| 2007/0228833 A1* | 10/2007 | Stevens | H02J 5/005 307/45 |

(Continued)

*Primary Examiner* — Kim Ngoc Huynh
*Assistant Examiner* — Danny Chan
(74) *Attorney, Agent, or Firm* — Larson Newman, LLP

(57) ABSTRACT

A wireless power delivery system includes a wireless power source and a control module. The wireless power source provides power to an information handling system. The control module is in communication with the wireless power source, and is configured to detect a presence signal from the information handling system, to set an output power level for the information handling system based on the presence signal, to receive a signal from the information handling system, and to adjust the output power level based on the signal.

15 Claims, 6 Drawing Sheets

(56) References Cited

U.S. PATENT DOCUMENTS

| | | | |
|---|---|---|---|
| 2009/0039828 A1* | 2/2009 | Jakubowski | H02J 7/025 320/106 |
| 2009/0108679 A1* | 4/2009 | Porwal | H02J 17/00 307/104 |
| 2009/0140691 A1* | 6/2009 | Jung | H02J 7/0027 320/108 |
| 2010/0083012 A1 | 4/2010 | Corbridge et al. | |
| 2010/0146308 A1 | 6/2010 | Gioscia et al. | |
| 2010/0171461 A1 | 7/2010 | Baarman et al. | |
| 2010/0201313 A1* | 8/2010 | Vorenkamp | H02J 17/00 320/108 |
| 2010/0253281 A1 | 10/2010 | Li | |
| 2011/0115430 A1 | 5/2011 | Saunamäki | |
| 2011/0136550 A1 | 6/2011 | Maugars | |
| 2011/0179292 A1 | 7/2011 | Clegg et al. | |
| 2011/0202777 A1 | 8/2011 | Hijazi et al. | |
| 2011/0241614 A1* | 10/2011 | Yeh | H02J 7/0027 320/108 |
| 2012/0098485 A1* | 4/2012 | Kang | H02J 7/025 320/108 |
| 2012/0214418 A1 | 8/2012 | Lee et al. | |
| 2012/0303939 A1* | 11/2012 | Cain | H04M 1/7253 713/1 |
| 2012/0313446 A1 | 12/2012 | Park et al. | |
| 2013/0002191 A1* | 1/2013 | Jung | H02J 7/025 320/103 |
| 2013/0007473 A1 | 1/2013 | van der Lee et al. | |
| 2013/0026981 A1* | 1/2013 | Van Der Lee | H02J 5/005 320/108 |
| 2013/0088192 A1* | 4/2013 | Eaton | G06F 1/266 320/108 |
| 2013/0154557 A1 | 6/2013 | Lee et al. | |
| 2013/0207599 A1 | 8/2013 | Ziv et al. | |
| 2013/0234661 A1 | 9/2013 | Yang et al. | |
| 2013/0281160 A1* | 10/2013 | Han | H04W 88/02 455/566 |

* cited by examiner

SYSTEM AND METHOD FOR PROVIDING WIRELESS POWER FEEDBACK IN A WIRELESS POWER DELIVERY SYSTEM

CROSS REFERENCE TO RELATED APPLICATIONS

This application is a continuation of U.S. patent application Ser. No. 13/475,652, entitled "System and Method for Providing Wireless Power Feedback in a Wireless Power Delivery System," filed on May 18, 2012, the disclosure of which is hereby expressly incorporated by reference in its entirety.

FIELD OF THE DISCLOSURE

This disclosure generally relates to information handling systems, and more particularly relates to a system and method for providing wireless power feedback in a wireless power delivery system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

A wireless power delivery system typically includes a wireless charging pad on to which a device can be placed for charging. The device can communicate with the pad via near field communication (NFC) to indicate that the device available to receive power. The wireless power delivery system can then wirelessly transmit power to the device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
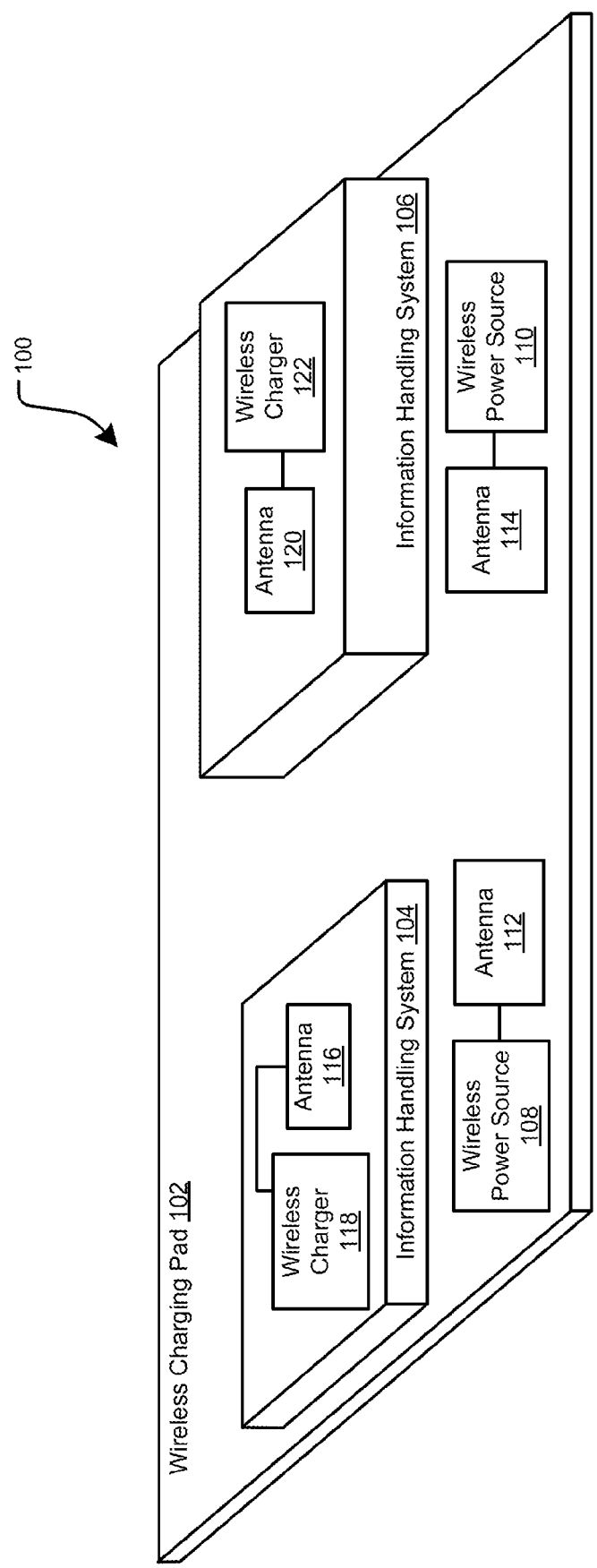
FIG. 1 is a block diagram of a wireless power delivery system.

FIG. 1 illustrates a wireless power delivery system 100 for an information handling system. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The wireless power delivery system 100 includes a wireless charging pad 102 and information handling systems 104 and 106. The wireless charging pad 102 includes wireless power sources 108 and 110, and antennas 112 and 114. The information handling system 104 includes an antenna 116 and a wireless charger 118. The information handling system 106 includes an antenna 120 and a wireless charger 122. The wireless power source 108 is in communication with the antenna 116, which in turn is in communication with the antenna 116 of the information handling system 104 and with the antenna 120 of the information handling system 106. The antenna 116 is in communication with the wireless charger 118. The antenna 120 is in communication with the wireless charger 122.

The wireless charging pad 102 can detect when a device such as one of the information handling systems 104 and 106 is placed on top of the wireless charging pad, and can transmit a detect signal in response to detecting the device. For example, the wireless charging pad 102 can detect the information handling system 104 when a light sensor on the wireless charging pad 102 is covered by the information handling system, by a pressure sensor of the wireless charging pad detecting the information handling system, by metal tabs of the wireless charging pad being placed in physical communication with the information handling system, and the like. The information handling system 104 can receive the detect signal from the wireless charging pad, and can respond by transmitting a presence signal to the wireless charging pad. The presence signal can include a repeating pulse signal, referred to as a chirp, and can also include information associated with the information handling system 104, such as a class of the information handling system. The class of the information handling system 104 can indicate a maximum power needed for the information handling system, or the like.

The wireless charging pad 102 can receive the presence signal from the information handling system 104, and can then set an initial power level to be provided from the wireless power source 108 to the information handling system. The initial power level can be a minimum power level available from the wireless charging pad 102, can be a maximum power level available from the wireless charging pad, or can be any power level in between the minimum and maximum power levels. The wireless charging pad 102 can then transmit the wireless power to the information handling system 104 via the antenna 112. The wireless charging pad 102 can use one or more techniques to provide power wirelessly, including inductive techniques, resonant inductive techniques, capacitive transfer techniques, beamed power transfer, such as laser or microwave transfer, or the like. However for purposes of discussion, it is assumed that the wireless charging pad 102 transfers power wirelessly using inductive power transfer. The antenna 116 of the information handling system 104 can receive the wireless power from the antenna 112 and can provide the power to the wireless charger 118, which in turn can convert the power to be used by the information handling system 104.

The information handling system 104 can monitor its current operating conditions and can determine whether to change a power state of the information handling system. For example, if the information handling system 104 is receiving the maximum amount of power from the wireless charging pad 102 and then the information handling system enters a lower power mode, the information handling system can send a power state change signal to the wireless charging pad 102. The power state change can indicate a new power state for the information handling system 104. The wireless charging pad 102 can receive the power state change signal and can adjust the power level provided by the wireless power source 108 to the information handling system 104, such that a proper power level is provided to the information handling system without having excess power that is not used or not having enough power for the information handling system. The information handling system 104 can continually monitor its operating mode and can provide any necessary state change signals to the wireless charging pad 102.

The information handling system 106 can also receive the detect signal from the wireless charging pad 102 in response to the information handling system being placed on top of the wireless charging pad. The information handling system 106 can respond to the detect signal by transmitting a presence signal similar to the presence signal of the information handling system 104 to the wireless charging pad. The wireless charging pad 102 can receive the presence signal from the information handling system 106, and can then set an initial power level to be provided from the wireless power source 110 to the information handling system. The wireless power can then be transmitted from the wireless charging pad 102 to the information handling system 106 via the antenna 114. The antenna 120 can receive the wireless power from the antenna 114 and can provide the power to the wireless charger 122, which in turn can convert the power to be used by the information handling system 106. The information handling system 106 can monitor its operating modes and can provide any necessary state change signals to the wireless charging pad 102 in a substantially similar fashion as the information handling system 104.

In an embodiment, when the wireless charging pad 102 provides wireless power to both of the information handling systems 104 and 106, the wireless charging pad can provide equal amounts of power to each of the information handling systems, can prioritize which information handling system to provide more power to, or the like. The information handling systems 104 and 106 can receive information indicating an amount of power to be provided to the information handling system from the wireless charging pad 102, and the like. The information handling systems 104 and 106 can utilize this information to determine whether the power available from the wireless charging pad 102 is enough to operate the information handling system at a maximum power operating mode or if the information handling system should operate in a lower operating mode. Each of the information handling systems 104 and 106 can dynamically adjust its operating mode based on the power available from the wireless charging pad 102. Thus, the wireless charging pad 102 and the information handling systems 104 and 106 can continually provide feedback to each other to adjust the amount of power provided from the wireless charging pad to the information handling systems.

Figure 2:
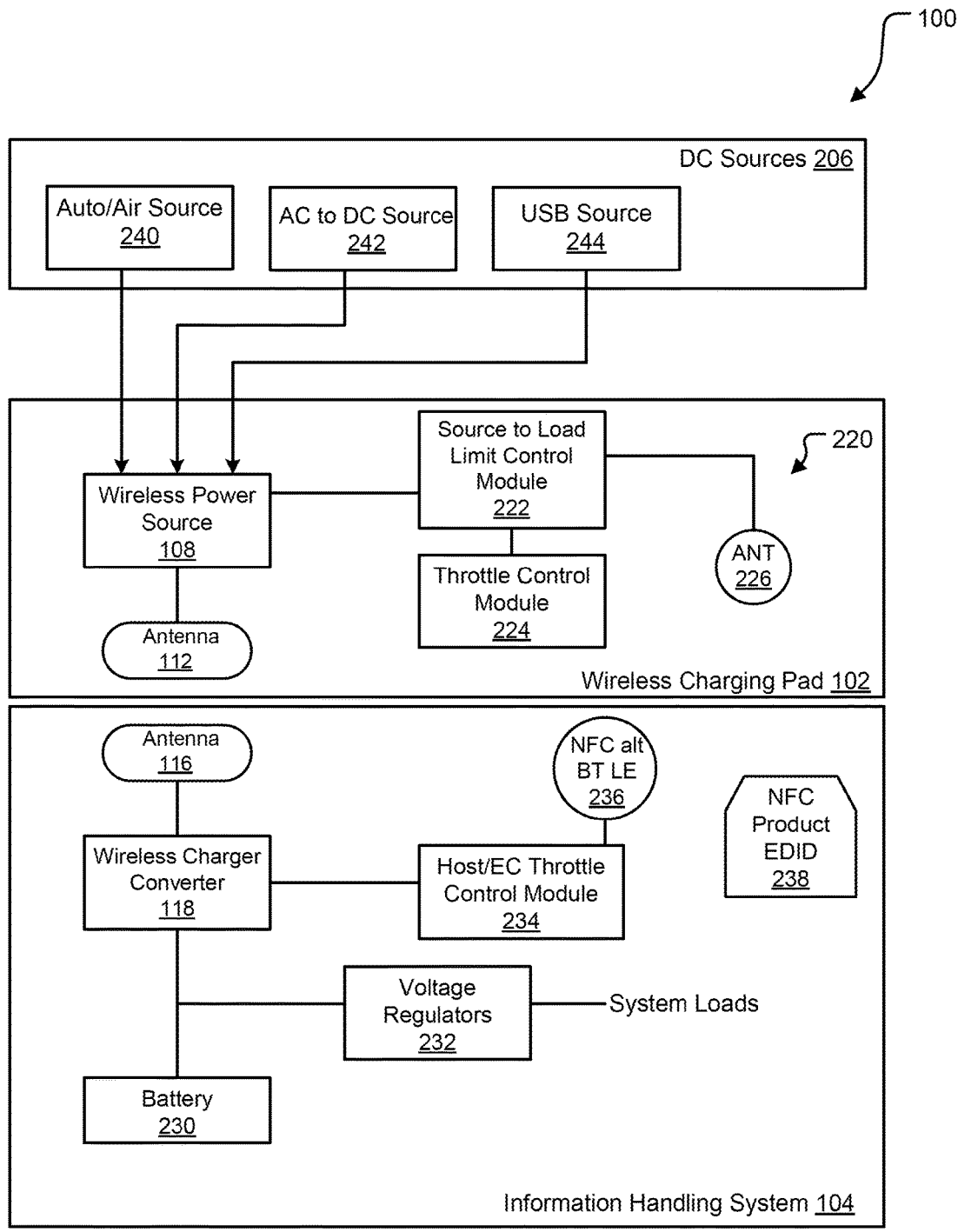
FIG. 2 is a more detailed block diagram of the wireless power delivery system.

FIG. 2 shows a more detailed embodiment of the wireless power delivery system 100 including the wireless charging pad 102, the information handling system 104, and a plurality of direct current DC sources 206 in more detail. The wireless charging pad 102 includes a landing pad 220, which in turn includes a source-to-load limit control module 222, a throttle control module 224, an antenna 226, the wireless power source 108, and the antenna 112. The antenna 112 is in communication with the wireless power source 108. The wireless power source 108 is in communication with the source-to-load limit control module 222, which in turn is in communication with the throttle control module 224 and with the antenna 226. In an embodiment, the wireless charging pad 102 can include multiple landing pads that can each communicate with and provide wireless power to different information handling systems. However, for simplicity only one landing pad of the wireless charging pad 102 has been shown in FIG. 2.

The information handling system 104 includes a battery 230, voltage regulators 232, a host/embedded controller (EC) throttle control module 234, a near field communication (NFC) alternative Bluetooth Low Energy (BT LE) antenna 236, and a NFC product Electronic Data Identification (EDID) tag 238, the antenna 116, and the wireless charger 118. The antenna 116 is in communication with the wireless charger 118, which in turn is in communication with the battery 230, with the voltage regulators 232, and with the host/EC throttle control module 234. The voltage regulators 232 can provide multiple regulated voltages to different systems loads of the information handling system 104, such as a central processing unit, a memory, a display device, and the like. The host/EC throttle control module 234 is in communication with the NFC alternate BT LE antenna 236. The host/EC throttle control module 234 can be a hardware module, a software module, and/or any combination of a hardware and software module. For example, the host/EC module 234 can be a power management integrated circuit, a power management unit, or the like. The plurality of DC sources 206 includes an automatic air source 240, an alternating current (AC)-to-DC source 242, and a universal serial bus (USB) power source 244. Each of the automatic air source 240, the AC-to-DC converter 242, and the USB power source 244 is in communication with the wireless power source 108 of the wireless charging pad 102.

When the information handling system 104 is placed within a NFC range of landing pad 220 of the wireless charging pad 102, the NFC product EDID tag 238 can transmit a presence signal, referred to as a chirp, to indicate that the information handling system is within range of the wireless charging pad. The presence signal can be a repeating pulse that can be received by the antenna 226, which in turn can provide the presence signal to the source-to-load limit control module 222. In an embodiment, the presence signal from the NFC product EDID 238 can also include information about the information handling system 104, such as a class of the information handling system.

When the source-to-load limit control module 222 receives the presence signal from the antenna 226, the source-to-load limit control module determines whether another signal is received from the throttle control module 224. If a signal is not received from the throttle control module 224, the source-to-load limit control module 222 can set an operation level of the wireless charging pad 102 to an initial operation level, such as a minimum level. The source-to-load limit control module 222 can send the operation level to the wireless power source 108, which can receive power from one of the DC power sources 206.

The wireless power source 108 can then provide power to the antenna 112, which in turn can wirelessly provide the power to the antenna 116 of the information handling system 104. The wireless charging pad 102 can use one or more techniques to provide power wirelessly, including inductive techniques, resonant inductive techniques, capacitive transfer techniques, beamed power transfer, such as laser or microwave transfer, or the like.

The antenna 116 can receive the wireless power from the antenna 112, and can provide power to the wireless charger 118. The wireless charger 118 can then convert the power received from the antenna 116 to a power source that can be utilized by the information handling system 104. The wireless charger 118 can either supply the converted power to the battery 230 or the voltage regulators 232. The power provided to the battery 230 can be used to charge the battery. The power provided to the voltage regulators 232 can be supplied at proper voltage to the remaining components of the information handling system 104.

The host/EC throttle control module 234 can receive information about the power provided by the wireless charging pad 102 from the wireless charger 118. The information can include whether the wireless charging pad 102 is compatible with the wireless charger converter, a total amount of power that the wireless charging pad is able to provide, or the like. The host/EC throttle control module 234 can also determine information about the information handling system 104, such as a percentage of the battery 230 that is charged, an operation mode of the information handling system, and the like.

If the host/EC throttle control module 234 determines that the wireless charging pad 102 is not compatible with the class of the information handling system 104, the host/EC throttle control module can set a flag to cause the wireless charger 118 not to receive power from the wireless charging pad. The host/EC throttle control module 234 can also notify the user, via a display device, that the information handling system 104 is not receiving power from the wireless charging pad 102. If the host/EC throttle control module 234 determines that the wireless charging pad 102 is compatible with the information handling system 104, the host/EC throttle control module 234 can determine an amount of power that is available from the wireless charging pad. If the host/EC throttle control module 234 determines that the maximum amount of power available from the wireless charging pad 102 is less than the amount needed to operate the information handling system 104 at maximum power, the host/EC throttle control module can modify an operating mode of the information handling system, such as operating below the maximum power. For example, the host/EC throttle control module 234 can cause the information handling system 104 to enter a standby or low power mode in response to determining that the maximum amount of power available from the wireless charging pad 102 is substantially less than the amount needed by the information handling system. The host/EC throttle control module 234 can cause the information handling system 104 to remain in the low power mode while the battery 230 is charged to a high enough capacity to operate the information handling system. In another embodiment, the host/EC throttle control module 234 can reduce the operational mode the information handling system 104, such that the voltage supplied to the central processing unit, the memory, and other components of the information handling system is reduced.

If the host/EC throttle control module 234 determines that the wireless charging pad 102 can provide more power than needed by the information handling system for maximum operation power, the host/EC throttle control module can determine a power state needed for the information handling system and can send the power state to the throttle control module 224. When the throttle control module 224 receives the power state from the host/EC throttle control module 234, the throttle control module can determine an operation level for the wireless charging pad 102. The throttle control module 224 can then send the operation level to the source-to-load limit control module 222, which in turn can determine an amount of power to be provided by the wireless power source 108. The source-to-load limit control module 222 can send a signal to the wireless power source 108 to set the power level for the wireless power source to provide to the information handling system 104 via the antenna 112.

The wireless charger 118 can receive power from the antenna 116 and can provide the power to either the battery 230 or the voltage regulators 232. While the information handling system 104 is receiving power from the wireless charging pad 102, the host/EC throttle control module 234 can continually monitor the operational mode of the information handling system 104 and can adjust the power state provided to the throttle control module 224. For example, the information handling system 104 may operate in a maximum power mode, and may switch to a low power mode such that the information handling system does not need the same amount of power. The power state can indicate the amount of power to be provided to the information handling system 104. In this situation, the host/EC throttle control module 234 can determine a new power state and send the new power state to the throttle control module 224, which in turn can adjust the operation level of the wireless charging pad 102. The change in the operation level of the wireless charging pad 102 can result in a change in the amount of power provided to the information handling system 104.

If the wireless charging pad 102 cannot provide the amount of power requested by the host/EC throttle control module 234 or any amount of power to the information handling system 104, the wireless charging pad can send information to the host/EC throttle control module 234 to indicate the current power available. The host/EC throttle control module 234 can then set a flag to indicate that a certain amount of power cannot be received from the wireless charging pad 102. The host/EC throttle control module 234 can also set a flag when the battery 230 is fully charged. The host/EC throttle control module 234 can then send information to the throttle control module 224 to indicate that the information handling system 104 does not currently need power from the wireless charging pad 102.

When the information handling system 104 is no longer in communication with the wireless charging pad 102, the host/EC throttle control module 234 can clear any flags set. Thus, if the information handling system 104 begins to communicate with the wireless charging pad 102 again, the communication and setup between host/EC throttle control module 234 and the throttle control module 224 can restart as described above. In another embodiment, when the information handling system 104 is no longer in communication with the wireless charging pad 102, the host/EC throttle control module 234 can continue to maintain the flag indicating that the battery 230 is fully charged until a point in time, if any, that the battery becomes less than fully charged.

In an embodiment, the throttle control module 224 can detect that another information handling system, such as the information handling system 106 of FIG. 1, has been placed in communication with a different landing pad of the wireless charging pad 102. The throttle control module can determine that the other information handling system has a higher priority than the information handling system 104, such that the wireless charging pad 102 provides the other information handling system with a certain amount of power before providing the information handling system 104 with power. In this situation, the throttle control module 224 may reduce the amount of power available to the information handling system 104. The throttle control module 224 can also send information indicating the reduced amount of power to the host/EC throttle control module 236, so that the host/EC throttle control module can modify the operational mode of the information handling system 104 based on the reduced amount of power available. Therefore, the information handling system 104 and the wireless charging pad 102 can provide feedback to one another indicating the amount of power available, any power state changes, or the like to enable the wireless charging pad to dynamically provide a proper amount of power to the information handling system.

Figure 3:
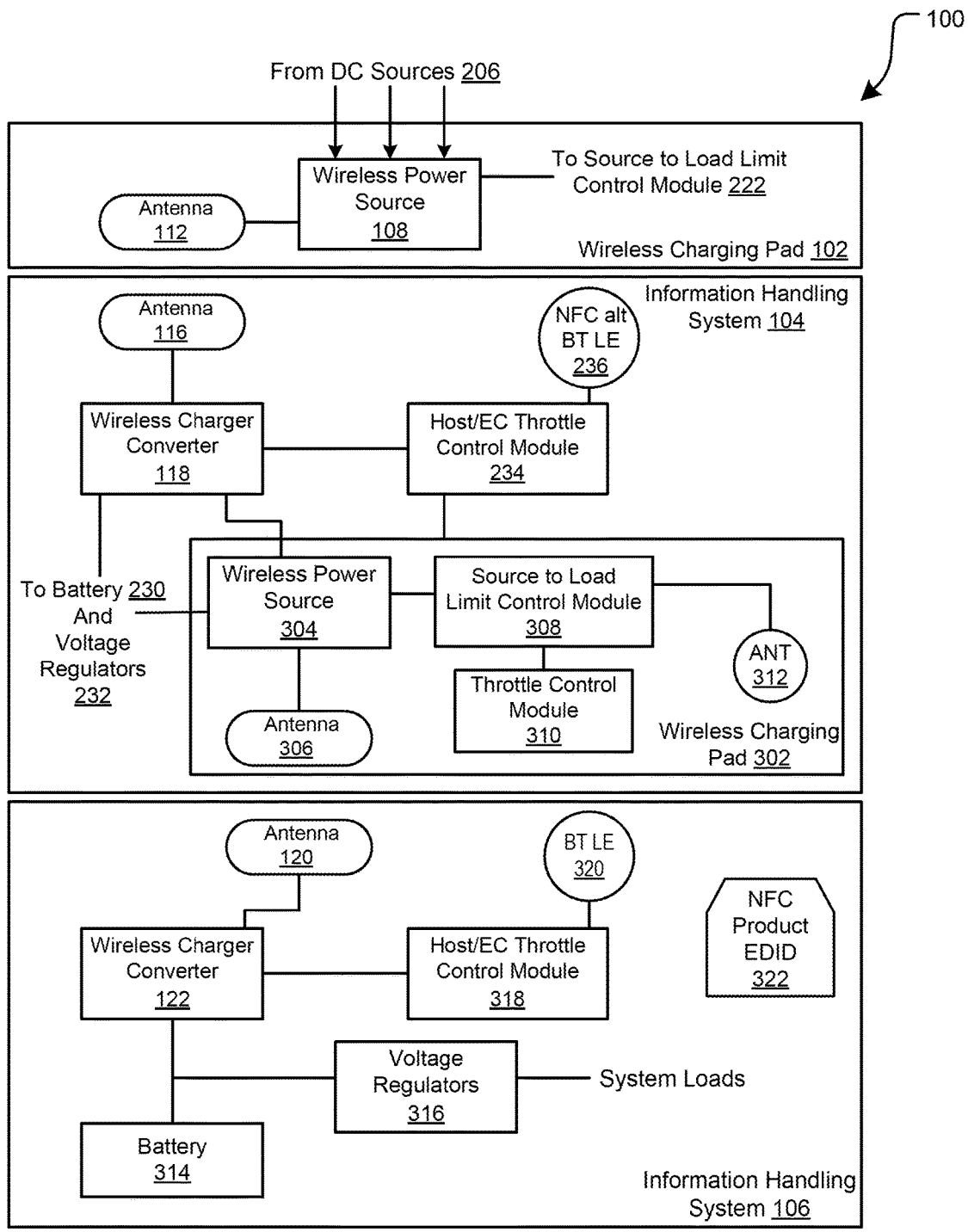
FIG. 3 shows another embodiment of the wireless power delivery system.

FIG. 3 shows another embodiment of the wireless power delivery system 100 including the wireless charging pad 102, the information handling system 104, and the information handling system 106 in more detail. The wireless charging pad 102 includes the same components and operates in substantially the same manner as described in FIGS. 1 and 2, but for simplicity only the wireless power source 108 and the antenna 112 have been shown. The antenna 112 is in communication with the wireless power source 108, which in turn is in communication with the source-to-load limit control module 222.

The information handling system 104 includes a wireless charging pad 302 having a wireless power source 304, an antenna 306, a source-to-load limit control module 308, a throttle control module 310, and an antenna 312. The information handling system 104 also includes the same components but for simplicity only the antenna 116, the wireless converter 118, the host/EC throttle control module 234, and the antenna 236 have been shown. The information handling system 106 includes a battery 314, voltage regulators 316, a host/EC throttle control module 318, a NFC alternative BT LE antenna 320, and a NFC product EDID tag 322, the antenna 120, and the wireless charger 122. The antenna 120 is in communication with the wireless charger 122, which in turn is in communication with the battery 314, with the voltage regulators 316, and with the host/EC throttle control module 318. The voltage regulators 316 can provide multiple regulated voltages to different systems loads of the information handling system 106, such as a central processing unit, a memory, a display device, and the like. The host/EC throttle control module 318 is in communication with the NFC alternate BT LE antenna 320. The host/EC throttle control module 318 can be a hardware module, a software module, and/or any combination of a hardware and software module. For example, the host/EC module 318 can be a power management integrated circuit, a power management unit, or the like.

When the information handling system 106 is placed within a NFC range of a landing pad of the wireless charging pad 302, the NFC product EDID tag 322 can transmit a presence signal, referred to as a chirp, to indicate that the information handling system 106 is within range of the wireless charging pad 302 of the information handling system 104. The presence signal can be a repeating pulse that can be received by the antenna 312, which in turn can provide the presence signal to the source-to-load limit control 308. In an embodiment, the presence signal from the NFC product EDID 322 can also include information about the information handling system 106, such as a class of the information handling system. In an embodiment, the wireless charging pad 302 of the information handling system 104 can detect the information handling system 106 when a light sensor on the wireless charging pad 302 is covered by the information handling system 106, by a pressure sensor of the wireless charging pad 302 detecting the information handling system 106, by metal tabs of the wireless charging pad 302 being placed in physical communication with the information handling system 106, and the like.

When the source-to-load limit control module 308 receives the presence signal from the antenna 312, the source-to-load limit control module determines whether another signal is received from the throttle control module 310. If a signal is not received from the throttle control module 310, the source-to-load limit control module 308 can set an operation level of the wireless charging pad 302 to an initial operation level, such as a minimum level. The source-to-load limit control module 308 can send the operation level to the wireless power source 304, which can receive power from the wireless charger converter 118, the battery 230, and/or the voltage regulators 232.

The wireless power source 304 can then provide power to the antenna 306, which in turn can wirelessly provide the power to the antenna 120 of the information handling system 106. The wireless charging pad 302 can use one or more techniques to provide power wirelessly, including inductive techniques, resonant inductive techniques, capacitive transfer techniques, beamed power transfer, such as laser or microwave transfer, or the like.

The antenna 120 can receive the wireless power from the antenna 306, and can provide power to the wireless charger 122. The wireless charger 122 can then convert the power received from the antenna 120 to a power source that can be utilized by the information handling system 106. The wireless charger 122 can either supply the converted power to the battery 314 or the voltage regulators 316. The power provided to the battery 314 can be used to charge the battery. The power provided to the voltage regulators 316 can be supplied at proper voltage to the remaining components of the information handling system 106.

The host/EC throttle control module 318 can receive information about the power provided by the wireless charging pad 302 from the wireless charger 122. The information can include whether the wireless charging pad 302 is compatible with the wireless charger converter 122, a total amount of power that the wireless charging pad is able to provide, or the like. The host/EC throttle control module 318 can also determine information about the information handling system 106, such as a percentage of the battery 314 that is charged, an operation mode of the information handling system, and the like.

If the host/EC throttle control module 318 determines that the wireless charging pad 302 is not compatible with the class of the information handling system 106, the host/EC throttle control module can set a flag to cause the wireless charger 122 not to receive power from the wireless charging pad. The host/EC throttle control module 318 can also notify the user, via a display device, that the information handling system 106 is not receiving power from the wireless charging pad 302 of the information handling system 104. If the host/EC throttle control module 318 determines that the wireless charging pad 302 is compatible with the information handling system 106, the host/EC throttle control module 318 can determine an amount of power that is available from the wireless charging pad. If the host/EC throttle control module 318 determines that the maximum amount of power available from the wireless charging pad 302 is less than the amount needed to operate the information handling system 106 at maximum power, the host/EC throttle control module can modify an operating mode of the information handling system, such as operating below the maximum power. For example, the host/EC throttle control module 318 can cause the information handling system 106 to enter a standby or low power mode in response to determining that the maximum amount of power available from the wireless charging pad 302 is substantially less than the amount needed by the information handling system. The host/EC throttle control module 318 can cause the information handling system 106 to remain in the low power mode until the battery 314 is charged to a high enough capacity to operate the information handling system. In another embodiment, the host/EC throttle control module 318 can reduce the operational mode the information handling system 106, such that the voltage supplied to the central processing unit, the memory, and other components of the information handling system is reduced.

If the host/EC throttle control module 318 determines that the wireless charging pad 302 can provide more power than needed by the information handling system 106 for maximum operation power, the host/EC throttle control module can determine a power state needed for the information handling system and can send the power state to the throttle control module 310. When the throttle control module 310 receives the power state from the host/EC throttle control module 318, the throttle control module can determine an operation level for the wireless charging pad 302. The throttle control module 310 can then send the operation level to the source-to-load limit control module 308, which in turn can determine an amount of power to be provided by the wireless charger converter 118. The source-to-load limit control module 308 can send a signal to the wireless power source 304 to set the power level for the wireless power source to provide to the information handling system 106 via the antenna 306.

The wireless charger 122 can receive power from the antenna 120 and can provide the power to either the battery 314 or the voltage regulators 316. While the information handling system 106 is receiving power from the wireless charging pad 302, the host/EC throttle control module 318 can continually monitor the operational mode of the information handling system 106 and can adjust the power state provided to the throttle control module 310. For example, the information handling system 106 may operate in a maximum power mode, and may switch to a low power mode such that the information handling system does not need the same amount of power. The power state can indicate the amount of power to be provided to the information handling system 106. In this situation, the host/EC throttle control module 318 can determine a new power state and send the new power state to the throttle control module 310, which in turn can adjust the operation level of the wireless charging pad 302. The change in the operation level of the wireless charging pad 302 can result in a change in the amount of power provided to the information handling system 106.

If the wireless charging pad 302 cannot provide the amount of power requested by the host/EC throttle control module 318 or any amount of power to the information handling system 106, the wireless charging pad can send information to the host/EC throttle control module 318 to indicate the current power available. The host/EC throttle control module 318 can then set a flag to indicate that a certain amount of power cannot be received from the wireless charging pad 302. The host/EC throttle control module 318 can also set a flag when the battery 314 is fully charged. The host/EC throttle control module 318 can then send information to the throttle control module 310 to indicate that the information handling system 106 does not currently need power from the wireless charging pad 302.

When the information handling system 106 is no longer in communication with the wireless charging pad 302, the host/EC throttle control module 318 can clear any flags set. Thus, if the information handling system 106 begins to communicate with the wireless charging pad 302 again, the communication and setup between host/EC throttle control module 318 and the throttle control module 310 can restart as described above. In another embodiment, when the information handling system 106 is no longer in communication with the wireless charging pad 302, the host/EC throttle control module 318 can continue to maintain the flag indicating that the battery 314 is fully charged until a point in time, if any, that the battery becomes less than fully charged.

In an embodiment, the source-to-load limit control module 308 of wireless charging pad 302 can communicate with the host/EC throttle control module 234 to provide information about the wireless charging pad to the host/EC throttle control module. For example, the host/EC throttle control module 234 can receive information indicating the amount of power being provided from the wireless charging pad 302 to the information handling system 106, indicating an amount of power requested by the information handling system 106, or the like. The host/EC throttle control module 234 can utilize the amount of power requested by the wireless charging pad 302 to adjust an amount of power requested from the wireless charging pad 102. Thus, a total amount of power received by the information handling system 104 from the wireless charging pad 102 can include an amount of power to be provided to the battery 230 and the other components of the information handling system 104, and an amount of power to be provided to the information handling system 106 via the wireless charging pad 302. Therefore, the power state provided from the information handling system 104 to the wireless charging pad 102 can include a power state of the information handling system 106 combined with the power state of the information handling system 104.

Figure 4:
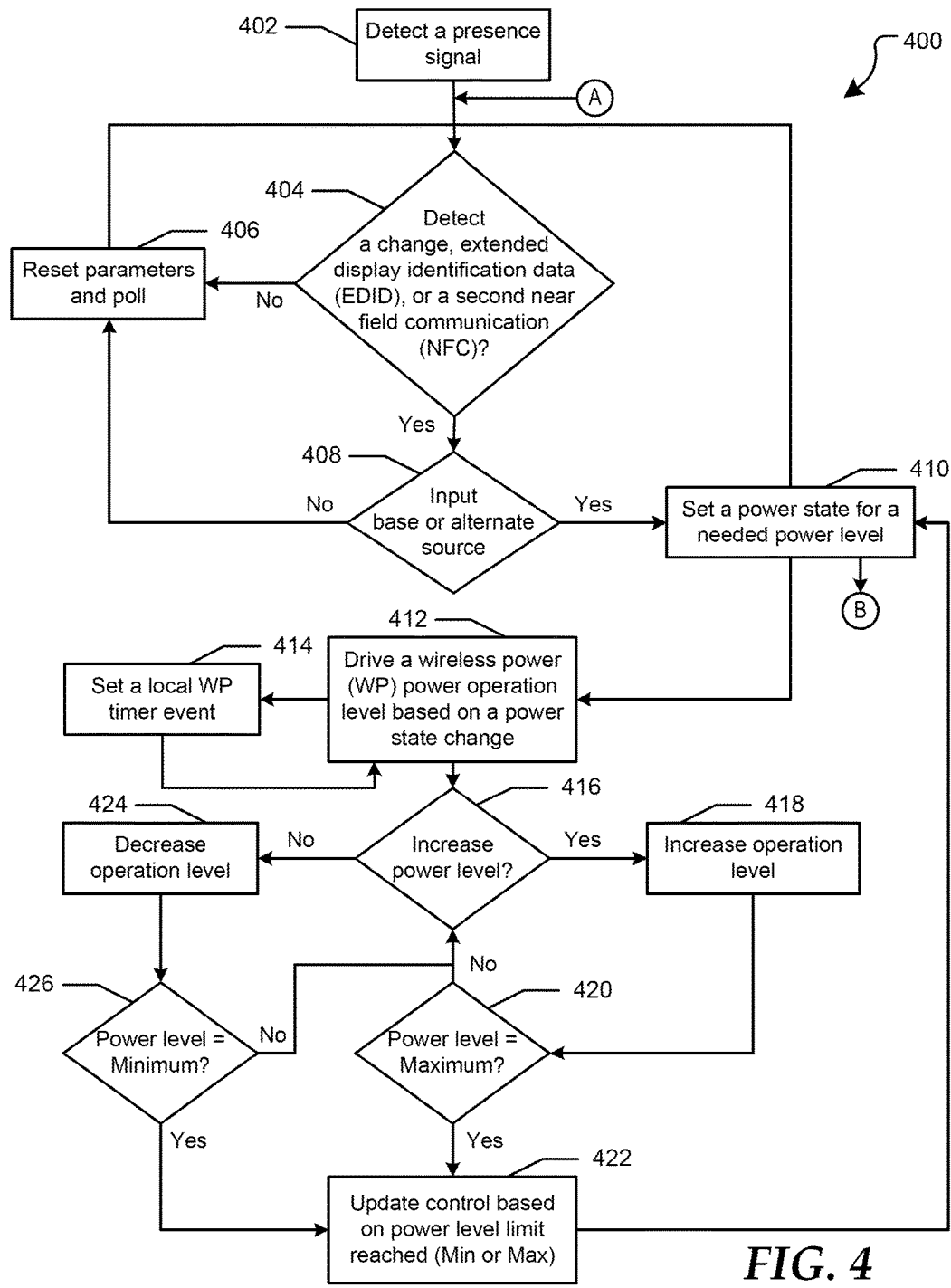
FIG. 4 shows a flow diagram of a method for controlling an amount of power provided from the wireless power delivery system.

FIG. 4 shows a flow diagram of a method 400 for controlling an amount of power provided from a wireless power delivery system. At block 402, a presence signal is received from an information handling system. The presence signal can be received at a wireless charging pad via a near field communication (NFC) signal. In an embodiment, the presence signal can be a signal indicating that the information handling system is present, can be the signal combined with a class identifier for the information handling system, or the like. The class identifier can indicate a maximum amount of power that the information handling system needs during operation. At block 404, a determination is made whether a state change for the information handling system is received, extended identification (EDID) information is received, or a second NFC signal is received. The EDID can include information about the power requirements for the information handling system, such as the maximum power the information handling system can receive, a nominal power for the information handling system, whether the information handling system is charging, in a low power mode, whether the an auxiliary battery needs to be charged, whether the information handling system is in standby mode, or the like.

If a state change, EDID information, and/or a second NFC signal are not received, power parameters of the wireless power delivery system are reset and the wireless power delivery system continues to poll the information handling system at block 406, and the flow continues as stated above at block 404. The wireless charging pad can provide a minimum power level when the power parameters are reset. If the state change, EDID information, and/or a second NFC are received, a determination is made whether an input base source or alternate power source is available at block 408. If an input base source or an alternative power source is not available, then the flow continues as stated above at block 406. If input base source or an alternative power source is available, then a power state needed for the information handling system is set at block 410.

At block 412, the new power state is used to drive a wireless power operation level of the wireless charging pad of the wireless power delivery system. A local wireless power time event is set at block 414, and then the flow returns to block 412 when the time event expires. The timer event can be a length of time to provide power the information handling system in the wireless power operation level. At block 416, a determination is made whether a power level of the wireless power delivery system needs to be increased based on the wireless power operation level. If the power level needs to be increased, the operation level is increased at block 418, and a determination is made whether the power level is at a maximum at block 420. In an embodiment, adjusting the operation level directly adjusts the power level provided by the wireless charging pad. If the operation level is not at a maximum the flow continues as state above at block 416. If the operation level is at the maximum, the control of the wireless power delivery system is updated based on the power level maximum being reached at block 422, and the flow continues as stated above at block 410.

However, if the power level does not need to be increased, the operation level of the wireless power delivery system is decreased at block 424. At block 426, a determination is made whether a minimum operation level of the wireless delivery system is reached. If the operation level is not at a minimum the flow continues as state above at block 416. If the operation level is at the minimum, the control of the wireless power delivery system is updated based on the power level minimum being reached at block 422, and the flow continues as stated above at block 410.

Figure 5:
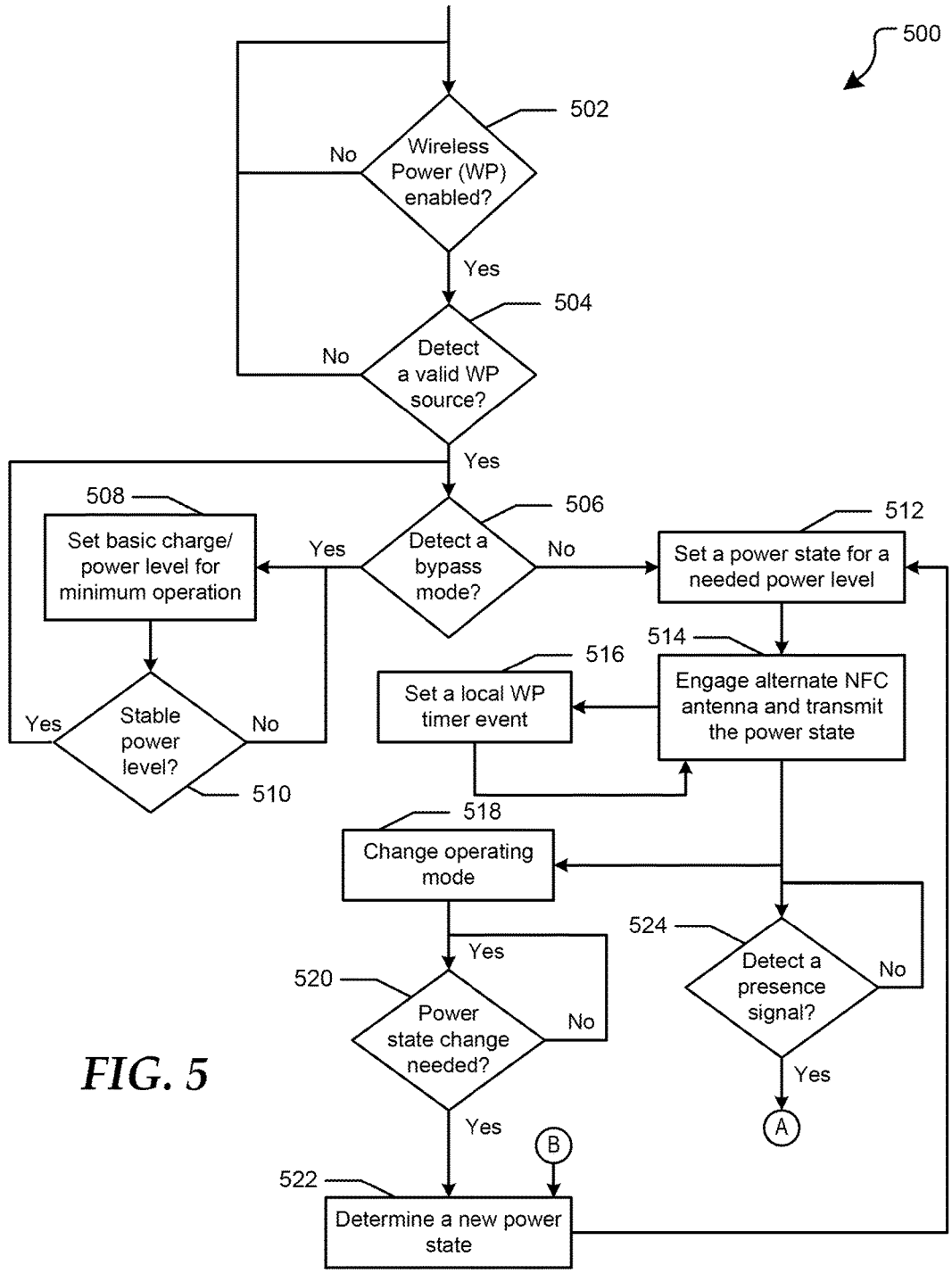
FIG. 5 shows a flow diagram of a method for controlling an amount of power received at an information handling system from the wireless power delivery system.

FIG. 5 shows a flow diagram of a method 500 for controlling an amount of power to be received at an information handling system from a wireless power delivery system. At block 502, a determination is made whether wireless power is enabled in the information handling system. When wireless power is enabled a determination is made whether a valid wireless power source, such as a wireless charging pad, is available at block 504. If a valid wireless power source is not available, then the flow continues as stated above at block 502. If a valid wireless power source is available, a determination is made whether the information handling system is in bypass mode at block 506. If the information handling system is in bypass mode, then a minimum power level for the information handling system is set based on the information handling system being in a bypass mode at block 508. At block 510, a determination is made whether a stable host power is detected for the information handling system. If a stable power is not detected, the flow continues as stated above at block 508. If a stable power is detected, the flow continues as stated above at block 506.

If the information handling system is not in the bypass mode, a power state of a needed power level is set at block 512. At block 514, an alternate near field communication (NFC) antenna is engaged and a power state is transmitted to the wireless charging pad. A local wireless power time event is set at block 516, and then the flow returns to block 514 when the time event expires. The timer event can be a length of time to provide power the information handling system in the wireless power operation level. At block 518, an operating mode of the information handling system is changed. A determination is made whether a power state change is needed at block 520. When a power state change is needed, a new power state is determined at block 522, and the flow continues as stated above at block 512.

In parallel to the determination whether a power state change is needed at block 520, a determination is made whether a presence signal is detected at 524. The presence signal can be detected in a wireless charging pad of the information handling system, and the presence signal can be received from another information handling system. When the presence signal is detected, the information handling system can perform the flow described above at FIG. 4 to determine the power requirement for the new information handling system and to provide the new information handling system with power. The information handling system can then determine a new power state at block 522 and continue as described above at block 512. The new power state can be based on the power requirement of both the information handling system and the new information handling system that the information handling system provides power to.

Figure 6:
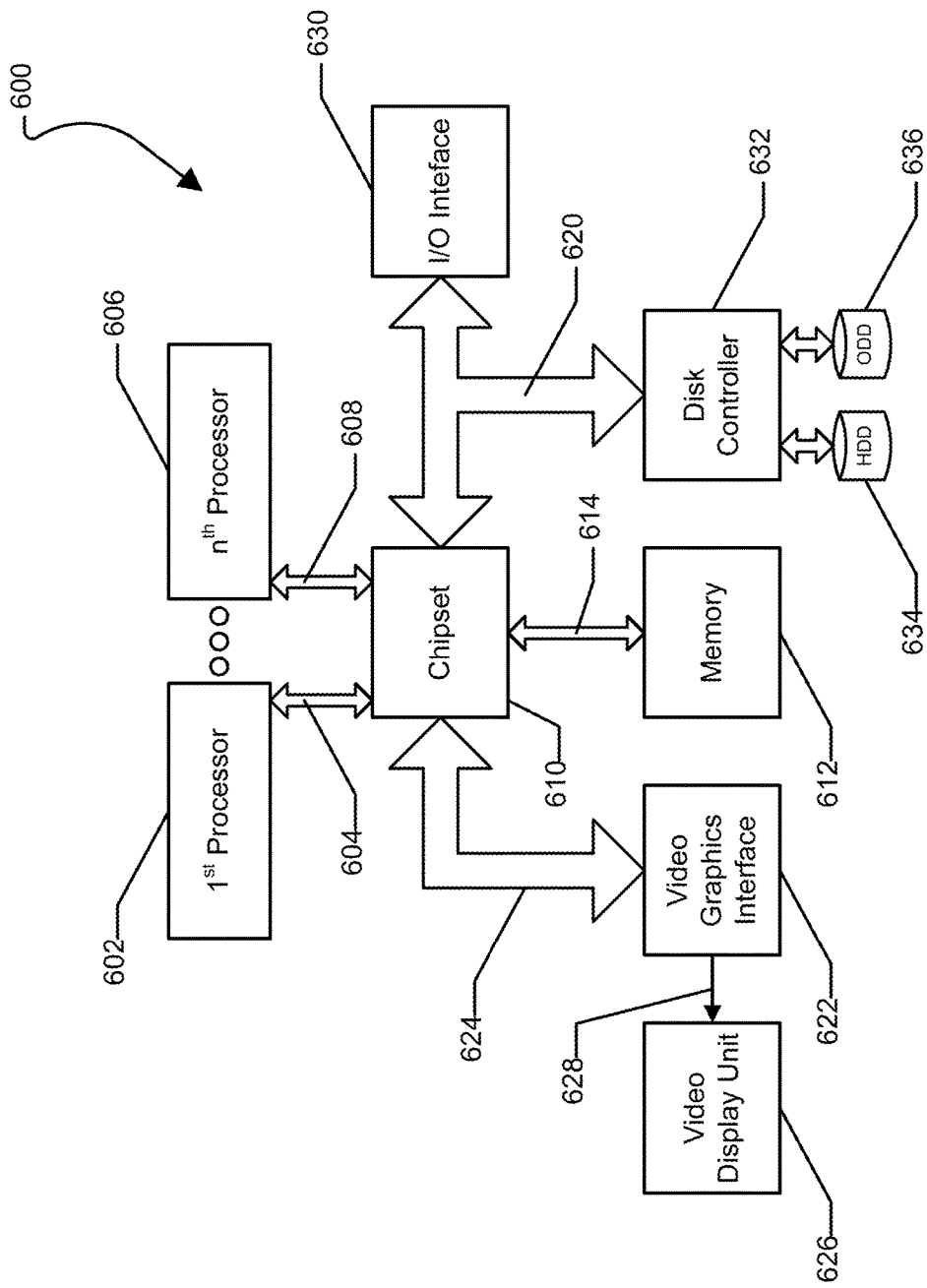
FIG. 6 is a block diagram of a general information handling system.

As shown in FIG. 6, the information handling system 600 can include a first physical processor 602 coupled to a first host bus 604 and can further include additional processors generally designated as $n^{th}$ physical processor 606 coupled to a second host bus 608. The first physical processor 602 can be coupled to a chipset 610 via the first host bus 604.

Further, the $n^{th}$ physical processor 606 can be coupled to the chipset 610 via the second host bus 608. The chipset 610 can support multiple processors and can allow for simultaneous processing of multiple processors and support the exchange of information within information handling system 600 during multiple processing operations.

According to one aspect, the chipset 610 can be referred to as a memory hub or a memory controller. For example, the chipset 610 can include an Accelerated Hub Architecture (AHA) that uses a dedicated bus to transfer data between first physical processor 602 and the $n^{th}$ physical processor 606. For example, the chipset 610, including an AHA enabled-chipset, can include a memory controller hub and an input/output (I/O) controller hub. As a memory controller hub, the chipset 610 can function to provide access to first physical processor 602 using first bus 604 and $n^{th}$ physical processor 606 using the second host bus 608. The chipset 610 can also provide a memory interface for accessing memory 612 using a memory bus 614. In a particular embodiment, the buses 604, 608, and 614 can be individual buses or part of the same bus. The chipset 610 can also provide bus control and can handle transfers between the buses 604, 608, and 614.

According to another aspect, the chipset 610 can be generally considered an application specific chipset that provides connectivity to various buses, and integrates other system functions. For example, the chipset 610 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 610. The chipset 610 can also be packaged as an application specific integrated circuit (ASIC).

The information handling system 600 can also include a video graphics interface 622 that can be coupled to the chipset 610 using a third host bus 624. In one form, the video graphics interface 622 can be an Accelerated Graphics Port (AGP) interface to display content within a video display unit 626. Other graphics interfaces may also be used. The video graphics interface 622 can provide a video graphics output 628 to the video display unit 626. The video display unit 626 can include one or more types of video displays such as a flat panel display (FPD) or other type of display device.

The information handling system 600 can also include an I/O interface 630 that can be connected via an I/O bus 620 to the chipset 610. The I/O interface 630 and I/O bus 620 can include industry standard buses or proprietary buses and respective interfaces or controllers. For example, the I/O bus 620 can also include a Peripheral Component Interconnect (PCI) bus or a high speed PCI-Express bus. In one embodiment, a PCI bus can be operated at approximately 66 MHz and a PCI-Express bus can be operated at more than one speed, such as 2.5 GHz and 4 GHz. PCI buses and PCI-Express buses can be provided to comply with industry standards for connecting and communicating between various PCI-enabled hardware devices. Other buses can also be provided in association with, or independent of, the I/O bus 620 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 610 can be a chipset employing a Northbridge/Southbridge chipset configuration (not illustrated). For example, a Northbridge portion of the chipset 610 can communicate with the first physical processor 602 and can control interaction with the memory 612, the I/O bus 620 that can be operable as a PCI bus, and activities for the video graphics interface 622. The Northbridge portion can also communicate with the first physical processor 602 using first bus 604 and the second bus 608 coupled to the $n^{th}$ physical processor 606. The chipset 610 can also include a Southbridge portion (not illustrated) of the chipset 610 and can handle I/O functions of the chipset 610. The Southbridge portion can manage the basic forms of I/O such as Universal Serial Bus (USB), serial I/O, audio outputs, Integrated Drive Electronics (IDE), and ISA I/O for the information handling system 600.

The information handling system 600 can further include a disk controller 632 coupled to the I/O bus 620, and connecting one or more internal disk drives such as a hard disk drive (HDD) 634 and an optical disk drive (ODD) 636 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail in the exemplary embodiments without materially departing from the novel teachings and advantages of the embodiments of the present disclosure. For example, the methods described in the present disclosure can be stored as instructions in a computer readable medium to cause a processor, such as chipset 610, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a wireless charger to receive power from a first wireless charging pad based on a first power state of the information handling system, and to provide the power to the information handling system;
a second wireless charging pad to receive the power from the wireless charger, to detect a first presence signal of a second information handling system, to determine a second power state for the second information handling system based on the first presence signal, to provide power to the second information handling system based on the second power state, to receive a first indication that the second information handling system does not need power in response to a flag being set when a battery of the second information handling system is fully charged, wherein the flag is cleared in response to the second information handling system no longer being in communication with the second wireless charging pad; and
a hardware control circuit to communicate with the wireless charger, the hardware control circuit to provide the first power state to the first wireless charging pad, to receive an adjust signal from the first wireless charging pad indicating a change in an amount of power available for the information handling system from the first wireless charging pad, and to change an operating mode of the information handling system in response to the change in the amount of power available.

2. The information handling system of claim 1 further comprising:
an antenna in communication with the wireless charger, the antenna to wirelessly receive the power from the wireless charging pad.

3. The information handling system of claim 1 further comprising:
an information tag to transmit a second presence signal to the first wireless charging pad, wherein the second presence signal includes a presence indication of the information handling system.

4. The information handling system of claim 3 wherein the presence signal further includes a maximum power requirement of the information handling system.

5. The information handling system of claim 1 further comprising:
an antenna to communicate with the hardware control module, the antenna to transmit the first power state to the wireless charging pad.

6. An information handling system comprising:
a wireless charger to receive power from a first wireless charging pad based on a first power state of the information handling system, and to provide the power to the information handling system;
a second wireless charging pad to receive the power from the wireless charger, to detect a first presence signal of a second information handling system, to determine a second power state for the second information handling system based on the first presence signal, to provide power to the second information handling system based on the second power state, to combine the second power state with the first power state to create a third power state, to provide the third power state to the first wireless charging pad, to receive a first indication that the second information handling system does not need power in response to a flag being set when a battery of the second information handling system is fully charged, wherein the flag is cleared in response to the second information handling system no longer being in communication with the second wireless charging pad; and
a hardware control circuit to communicate with the wireless charger, the hardware control circuit to provide the first power state to the first wireless charging pad, to receive an adjust signal from the first wireless charging pad indicating a change in an amount of power available for the information handling system from the first wireless charging pad, and to change an operating mode of the information handling system in response to the change in the amount of power available.

7. The information handling system of claim 6 further comprising:
an antenna in communication with the wireless charger, the antenna to wirelessly receive the power from the wireless charging pad.

8. The information handling system of claim 6 further comprising:
an information tag to transmit a second presence signal to the first wireless charging pad, wherein the second presence signal includes a presence indication of the information handling system.

9. The information handling system of claim 8 wherein the second presence signal further includes a maximum power requirement of the information handling system.

10. The information handling system of claim 6 further comprising:
an antenna to communicate with the hardware control module, the antenna to transmit the first power state to the first wireless charging pad.

11. A method comprising:
providing a first presence signal to a first wireless charging pad;
receiving, at an antenna of the first information handling system, power based on the first presence signal;
receiving, at a second wireless charging pad of the first information handling system, a second presence signal from a second information handling system;
determining a first power state for the second information handling system based on the second presence signal;
providing, by the second wireless charging pad, power to the second information handling system based on the first power state;
receiving a first indication that the second information handling system does not need power in response to a flag being set when a battery of the second information handling system is fully charged, wherein the flag is cleared in response to the second information handling system no longer being in communication with the second wireless charging pad;
detecting a change in an amount of power available for the information handling system;
sending an adjustment signal to the information handling system indicating the change in the amount of power available to the information handling system; and
changing an operating mode of the information handling system in response to the change in the amount of power available.

12. The method of claim 11 wherein the change in the amount of power available to the information handling system is based on a priority of the information handling system as compared to another information handling system in communication with the wireless charging pad.

13. The method of claim 11 wherein the first presence signal includes a presence indication and a maximum power requirement of the first information handling system.

14. The method of claim 11 wherein the second presence signal includes a presence indication and a maximum power requirement of the second information handling system.

15. The method of claim 11 further comprising:
receiving the power from a direct current power source prior to setting an output power level for the information handling system; and
adjusting the power to the output power level based on the presence signal.

* * * * *